United States Patent
Kawaguchi et al.

(10) Patent No.: US 9,207,110 B2
(45) Date of Patent: Dec. 8, 2015

(54) LIQUID LEVEL DETECTING DEVICE

(71) Applicant: YAZAKI CORPORATION, Tokyo (JP)

(72) Inventors: Yasunori Kawaguchi, Shimada (JP); Shinpei Kato, Shimada (JP); Toshiaki Fukuhara, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 256 days.

(21) Appl. No.: 13/857,299

(22) Filed: Apr. 5, 2013

(65) Prior Publication Data
US 2013/0269431 A1 Oct. 17, 2013

(30) Foreign Application Priority Data
Apr. 12, 2012 (JP) .................................. 2012-091362

(51) Int. Cl.
*G01F 23/22* (2006.01)
*G01F 25/00* (2006.01)
*G01F 23/26* (2006.01)

(52) U.S. Cl.
CPC .............. *G01F 23/22* (2013.01); *G01F 23/263* (2013.01); *G01F 23/265* (2013.01); *G01F 23/266* (2013.01); *G01F 23/268* (2013.01); *G01F 25/0061* (2013.01)

(58) Field of Classification Search
CPC ........ G01F 23/22; G01F 23/26; G01F 23/263
USPC ....................................................... 73/304 C
See application file for complete search history.

(56) References Cited

U.S. PATENT DOCUMENTS

| | | | | |
|---|---|---|---|---|
| 3,862,571 A | * | 1/1975 | Vogel .................... | G01F 23/263 324/606 |
| 4,674,329 A | * | 6/1987 | Mulder ................. | G01F 23/263 361/284 |
| 5,613,399 A | * | 3/1997 | Hannan et al. .............. | 73/304 C |

(Continued)

FOREIGN PATENT DOCUMENTS

| CN | 101033997 A | 9/2007 |
|---|---|---|
| CN | 201697691 U | 1/2011 |

(Continued)

OTHER PUBLICATIONS

Office Action dated May 25, 2015 issued by the State Intellectual Property Office of the People's Republic of China in counterpart Chinese Patent Application No. 201310127563.2.

*Primary Examiner* — Hezron E Williams
*Assistant Examiner* — Mark A Shabman
(74) *Attorney, Agent, or Firm* — Sughrue Mion, PLLC (57) ABSTRACT

A liquid level detecting device includes a first detecting part that has a first electrode extending in a vertical direction in the tank and opposing to a ground electrode and detects a first electrostatic capacity between the first electrode and the ground electrode, a second detecting part that has a second electrode extending in the vertical direction in the tank and opposing to the ground electrode and detects a second electrostatic capacity between the second electrode and the ground electrode, and a difference calculating part that calculates a difference between the first electrostatic capacity detected by the first detecting part and the second electrostatic capacity detected by the second detecting part as a capacity difference and determines whether the liquid level in the tank is above a warning threshold.

9 Claims, 6 Drawing Sheets

(56) References Cited

U.S. PATENT DOCUMENTS

| | | | |
|---|---|---|---|
| 6,293,145 B1 * | 9/2001 | Wallrafen | G01F 23/268 340/450 |
| 2007/0188970 A1 * | 8/2007 | Inaba et al. | 361/212 |
| 2007/0206367 A1 * | 9/2007 | Yasukawa | 361/784 |
| 2007/0221355 A1 | 9/2007 | Yoshinari et al. | |
| 2012/0240675 A1 * | 9/2012 | Farmanyan | 73/304 |
| 2012/0263485 A1 * | 10/2012 | Oba et al. | 399/57 |

FOREIGN PATENT DOCUMENTS

| | | |
|---|---|---|
| JP | 63-079016 A | 4/1988 |
| JP | 2705257 B2 | 10/1997 |
| JP | 2007-40753 A | 2/2007 |

\* cited by examiner

LIQUID LEVEL DETECTING DEVICE

CROSS REFERENCE TO RELATED APPLICATION

This application is based on Japanese Patent Applications No. 2012-091362 filed on Apr. 12, 2012, the contents of which are incorporated herein by reference.

BACKGROUND OF THE INVENTION

1. Technical Field

The present invention relates to a liquid level detecting device which detects the liquid level of liquid in a tank.

2. Background Art

Traditionally, a liquid level detecting device is known which detects the liquid level of liquid in a tank with an electrostatic capacity method of detecting the liquid level from a difference between the electrostatic capacity of gas and that of the liquid (refer to JP-A-S63-079016 and Japanese Patent No. 2705257).

In the JP-A-S63-079016, it is disclosed that the dielectric constant of the liquid is calculated from the capacity between the electrodes of a reference electrode which is always immersed in the liquid, and the liquid level is detected from the capacity between the electrodes of a tine electrode using the dielectric constant.

In Japanese Patent No. 2705257, it is disclosed that the dielectric constant is corrected using electrodes of different lengths, and a warning lamp is turned on if the liquid level becomes below a specified level.

Figure 6:
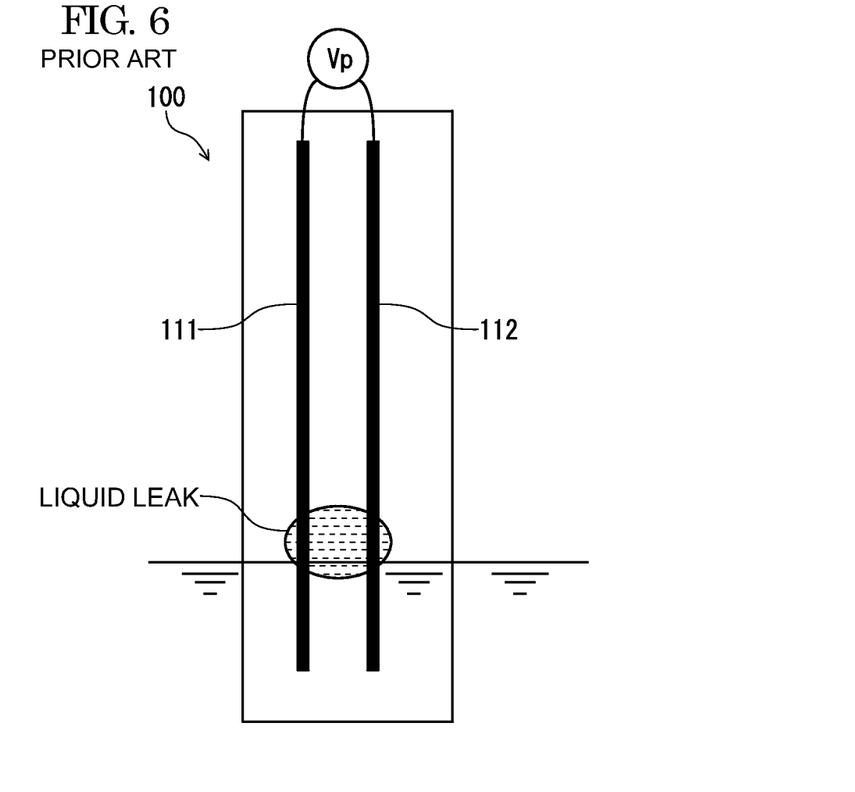
FIG. 6 is a figure which shows a liquid leak state in a traditional liquid level detecting device.

However, there are the following problems in the traditional liquid level detecting device. FIG. 6 is a figure which shows a liquid leak state in a traditional liquid level detecting device. There is a problem that, as shown in FIG. 6, when there is a liquid leak between electrodes 111 and 112 or there is a drop of dew in the vapour phase part due to a vapor (steam) state or dew condensation in the tank, a liquid level detecting device 100 detects mistakenly when the liquid surface is located above the real liquid level, and does not make a warning lamp turned on.

There is the same problem that the liquid surface cannot be detected precisely when liquids of different dielectric constants are separated in the tank.

The present invention is made in view of the above circumstances, and the object of the present invention is to provide a liquid level detecting device which can detect liquid level precisely even when there is a liquid leak or a drop of dew in the vapor phase part or when liquids of different dielectric constants are separated.

SUMMARY OF THE INVENTION

To achieve the previously described object, the liquid level detecting devices of the present invention are characterized in the following (1) to (4).

(1) A liquid level detecting device for detecting a liquid level of liquid in a tank includes a first detecting part that has a first electrode extending in a vertical direction in the tank and opposing to a ground electrode and detects a first electrostatic capacity between the first electrode and the ground electrode, a second detecting part that has a second electrode extending in the vertical direction in the tank and opposing to the ground electrode and detects a second electrostatic capacity between the second electrode and the ground electrode, a length of the second electrode being shorter than a length of the first electrode in the vertical direction at a bottom side and a difference calculating part that calculates a difference between the first electrostatic capacity detected by the first detecting part and the second electrostatic capacity detected by the second detecting part as a capacity difference and determines whether the liquid level in the tank is above a warning threshold based on the capacity difference.

(2) The liquid level detecting device of (1) further includes a dielectric constant detecting part that is arranged at the bottom of the tank and detects a dielectric constant of the liquid, and the difference calculating part calculates the liquid level in the tank by using the dielectric constant detected by the dielectric constant detecting part as a correction coefficient.

(3) In the liquid level detecting device of (1), the tip of the second electrode at the bottom side is arranged at a position corresponding to the warning threshold, and an alarming signal is output when the capacity difference becomes smaller than the warning threshold.

(4) In the liquid level detecting device of (1), the first electrode and the ground electrode are formed into a tine shape, respectively, and the distance between the first electrode and the ground electrode is uniform.

According to the liquid level detecting device of the constructions of the above (1) to (4), because the liquid level in the tank is obtained based on the capacity difference, the liquid level can be detected precisely even when there is a liquid leak, when there is a drop of dew in the vapor phase part, or when liquids of different dielectric constants are separated.

According to the present invention, because the liquid level in the tank is obtained based on the capacity difference, the liquid level can be detected precisely even when there is a liquid leak, when there is a drop of dew in the vapor phase part, or when liquids of different dielectric constants are separated.

The present invention has been briefly described above. Further, details of the invention will become more apparent after embodiments of the invention described below (hereinafter referred to as "embodiments") are read with reference to the accompanying figures.

DESCRIPTION OF EMBODIMENTS

A liquid level detecting device in the embodiment of the present invention is described by using the figures. The liquid level detecting device in the embodiment is adapted to detect the liquid level of liquid (gasoline, oil, ethanol mixed gasoline or the like) in a tank.

Figure 1A:
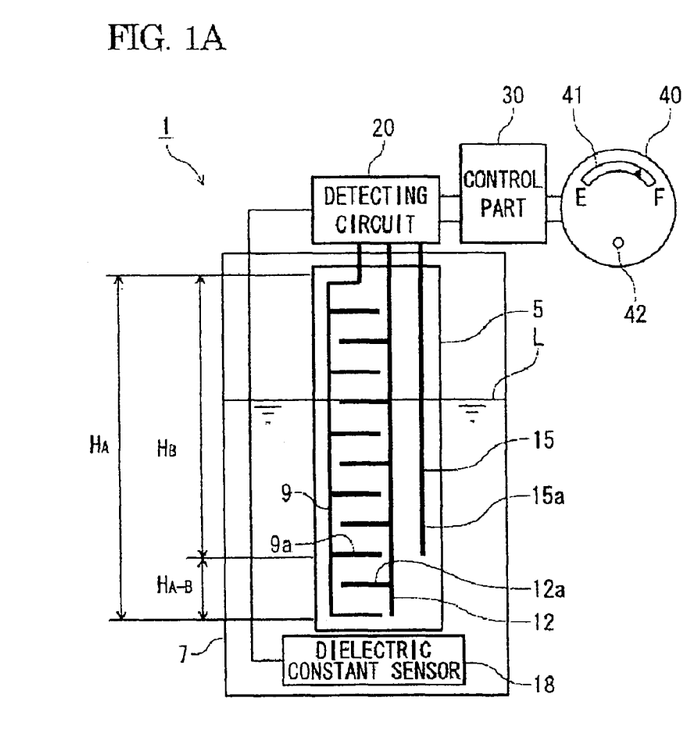
FIGS. 1A and 1B are figures which show a schematic construction of a liquid level detecting device 1 in an embodiment.
Figure 1B:
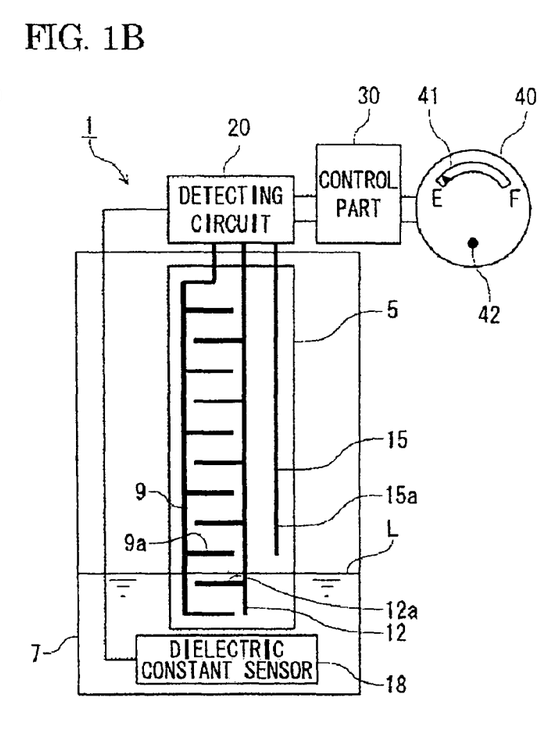

FIGS. 1A and 1B are figures which show a schematic construction of the liquid level detecting device 1 in the embodiment. The liquid level detecting device 1 includes a liquid level detecting part 5, a detecting circuit 20, a control part 30 and a meter 40. The liquid level detecting part 5 is accommodated in a tank 7, and has the liquid level sensor 9 which has a tine electrode 9a, a ground electrode 12 which has a tine electrode 12a opposite to the tine electrode 9a, a linear warning sensor 15 which is arranged at the back surface of the ground electrode 12, and a dielectric constant sensor 18.

The liquid level sensor 9 (a first detecting part) has the tine electrode 9a (a first electrodes) which extends in the vertical direction in the tank 7, and detects the electrostatic capacity between the tine electrodes 9a and 12a which changes in accordance with the amount of liquid that stays in the tank 7. The distance between the tine electrodes 9a and 12a is uniform.

The ground electrode 12 extends in the vertical direction in the tank 7, and one side of the ground electrode 12 is formed into the tine electrode 12a opposite to the tine electrode 9a, and the other side is formed into a linear shape.

The warning sensor 15 (a second detecting part) has a detective electrode 15a (a second electrode) which extends into a linear shape parallel to the other side of the ground electrode 12. The tip of the detective electrode 15a is located in a predetermined height (threshold) from the bottom of the tank 7 which is so determined that it is necessary to issue a warning if the liquid level in the tank 7 is below the tip of the detective electrode 15a. In FIG. 1A, it is shown that the liquid level L is higher than the threshold, and the liquid level in this case becomes a liquid level 2. In FIG. 1B, it is shown that the liquid level L is below the threshold, and the liquid level in this case becomes a liquid level 1.

The dielectric constant sensor 18 is arranged at the bottom of the tank 7 so that the dielectric constant sensor 18 is always immersed in the liquid in the tank 7. The dielectric constant sensor 18 has a detective electrode formed into a tine shape, and detects the electrostatic capacity between the detective electrode and the ground electrode. The electrostatic capacity between the detective electrode and the ground electrode is used to calculate the dielectric constant of the liquid. The distance between the detective electrode and the ground electrode is uniform.

The dielectric constant ∈ is calculated according to a mathematical formula (1) as is well-known. That is, the dielectric constant ∈ of the liquid in the tank 7 is calculated by detecting the electrostatic capacity between the detective electrode and the ground electrode with the dielectric constant sensor 18.

$$\in = C \cdot l / S \quad (1)$$

wherein, C is the electrostatic capacity, l is the distance between the electrodes, and S is the area of the electrodes.

In this embodiment, the liquid level sensor 9, the ground electrode 12 and the warning sensor 15 is formed on a printed circuit board (not shown in the figures) as a liquid detecting part 5. The dielectric constant sensor 18 may be formed on the same printed circuit board.

Figure 2:
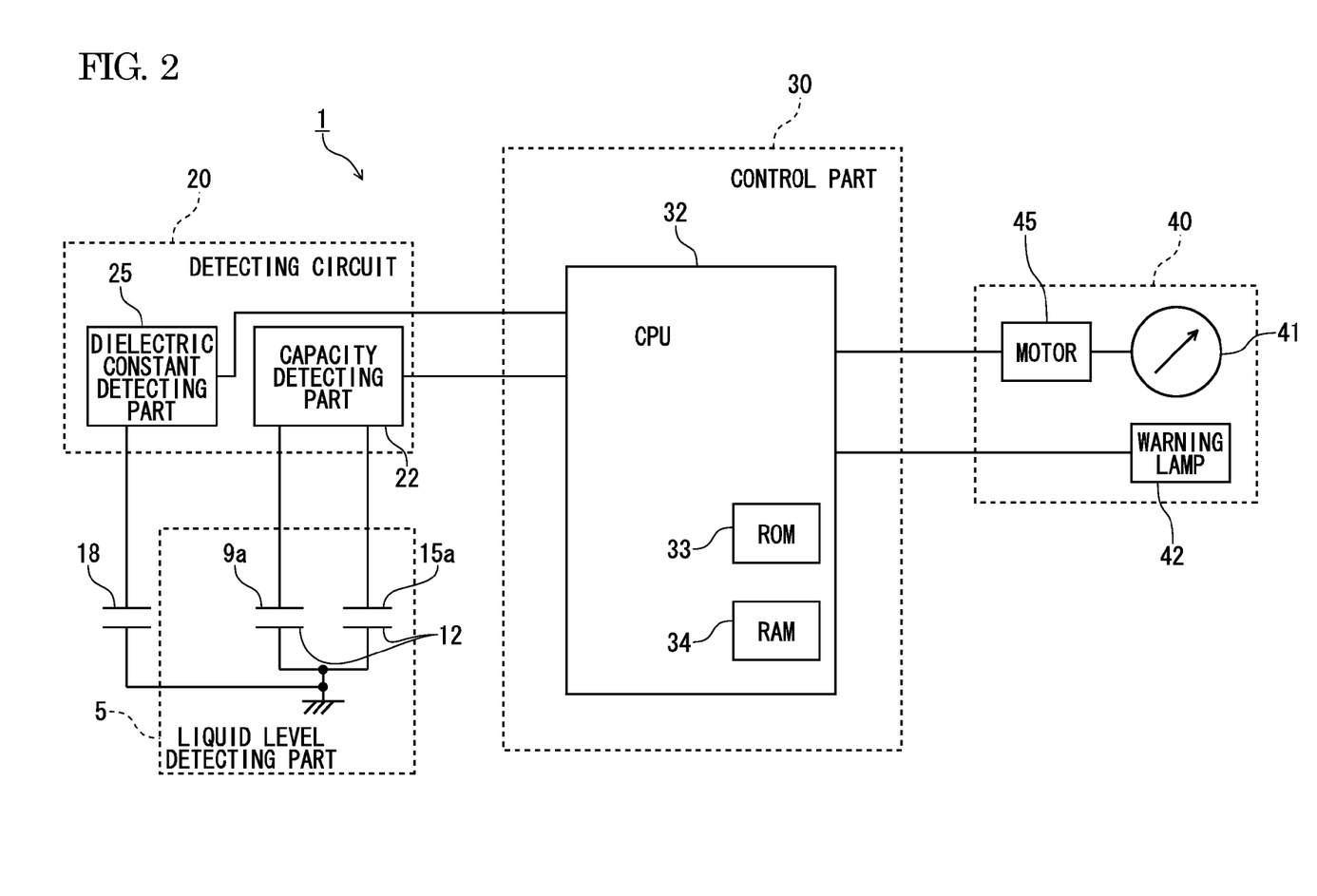
FIG. 2 is a figure which shows an electrical construction of the liquid level detecting device 1.

FIG. 2 is a figure which shows an electrical construction of the liquid level detecting device 1. The detecting circuit 20 has a capacity detecting part 22 which detects the electrostatic capacity of the liquid level sensor 9 and the electrostatic capacity of the warning sensor 15, and a dielectric constant detecting part 25 which detects the electrostatic capacity of the dielectric constant sensor 18 and calculates the dielectric constant from this electrostatic capacity.

The capacity detecting part 22 calculates an electrostatic capacity $C_A$ from the oscillation frequency of an oscillating circuit which assumes the tine electrode 9a of the liquid level sensor 9 and the tine electrode 12a of the ground electrode 12 as a condenser. The capacity detecting part 22 calculates an electrostatic capacity $C_B$ from the oscillation frequency of an oscillating circuit which assumes the detective electrode 15a of the warning sensor 15 and the ground electrode 12 as a condenser. The capacity detecting part 22 may perform these operations by switching, or may perform these operations at the same time with 2 systems of circuits.

Likewise, the dielectric constant detecting part 25 calculates an electrostatic capacity C from the oscillation frequency of an oscillating circuit which assumes the detective electrode of the dielectric constant sensor 18 and the ground electrode as a condenser, and further calculates the dielectric constant ∈ according to a mathematical formula (1) from a distance l between the electrodes and an electrode area S which are known.

The control part 30 mainly includes a microcomputer (CPU) 32. The CPU 32 contains a ROM 33 where an operation program to be described below is stored and a RAM 34 which is a work memory, performs various calculations by being input signals representing the electrostatic capacity from the detecting circuit 20, and outputs a drive signal to the meter 40.

The meter 40 has a motor 45 which is driven depending on the drive signal from the CPU 32, an indicator 41 which indicates the liquid level with a pointer pivotally supported by the motor 45, and a warning lamp 42 which is turned on according to a warning signal from the CPU 32.

Figure 3:
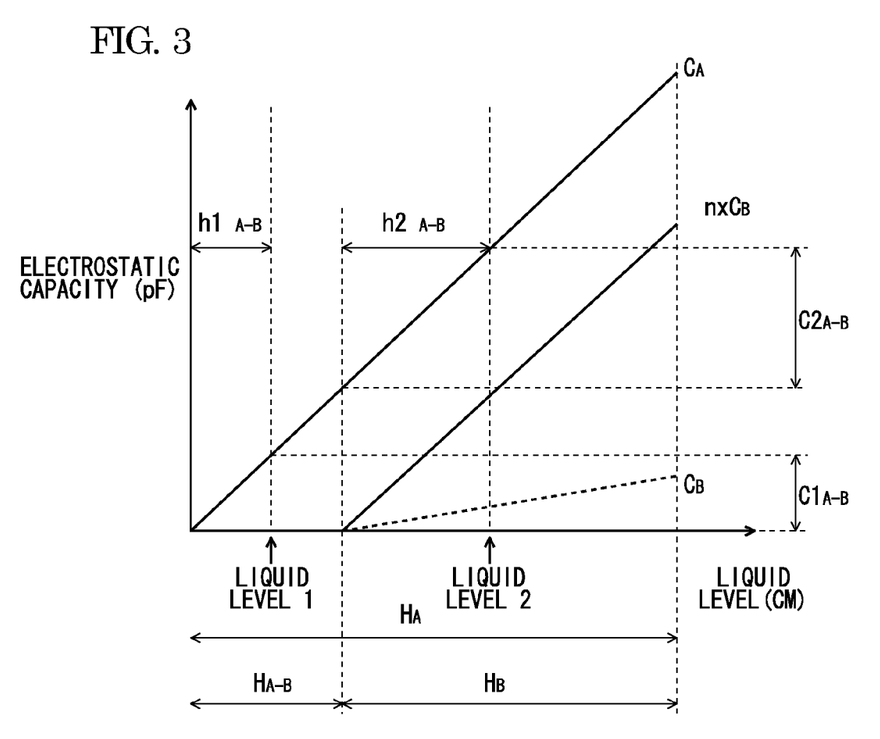
FIG. 3 is a graph which shows output properties of a liquid level sensor 9 and a warning sensor 15.

The operation of the liquid level detecting device 1 having the above construction is shown. First, a method of detecting the liquid level in the tank 7 by using the liquid level sensor 9 and the warning sensor 15 is described. FIG. 3 is a graph which shows output properties of the liquid level sensor 9 and the warning sensor 15. The vertical axis shows the electrostatic capacity (pF), and the horizontal axis shows the liquid level (cm).

Herein, $C_A$ is the electrostatic capacity detected with the liquid level sensor 9. $C_B$ is the electrostatic capacity detected with the warning sensor 15.

"n" is a capacity ratio correction coefficient to equalize the electrostatic capacity per unit length of the warning sensor 15 to the electrostatic capacity per unit length of the liquid level sensor 9. That is, the capacity ratio correction coefficient n is a correction coefficient to make the inclination of the straight line of the electrostatic capacity $C_B$ to align with the inclination of the straight line of the electrostatic capacity $C_A$, as shown in FIG. 3.

"k" is a liquid level conversion factor to convert the electrostatic capacity C to the liquid level h by using the dielectric constant ∈ obtained from the measurement of the dielectric constant sensor 18. Even if the liquid kind in the tank changes, the liquid level h can be calculated precisely by using the measured dielectric constant ∈ in the calculation of the liquid level correction coefficient k.

"$h_{A-B}$" is the detected liquid level difference (cm) corresponding to the difference between the length of the liquid level sensor 9 (the tine electrode 9a) and the length of the warning sensor 15 (the detective electrode 15a). $H_A$ is the real length (cm) of the liquid level sensor 9. $H_B$ is the real length (cm) of the warning sensor 15. $H_{A-B}$ is the difference between the length $H_A$ and the length $H_B$ (warning liquid level).

As described previously, the liquid level 1 is below the warning sensor 15, and the liquid level 2 is above the warning sensor 15. $C1_{A-B}$ is the capacity difference between the electrostatic capacity $C_A$ and the electrostatic capacity $C_B$, which are calculated at the liquid level 1. $C2_{A-B}$ is the capacity difference between the electrostatic capacity $C_A$ and the electrostatic capacity $C_B$, which are calculated at the liquid level 2.

In this embodiment, the capacity difference $C_{A-B}$ is converted to the liquid level difference $h_{A-B}$ according to a mathematical formula (2) by using the liquid level correction coefficient k.

$$K \cdot C_{A-B} = h_{A-B} \quad (2)$$

"$h1_{A-B}$" is a liquid level difference calculated by using the capacity difference $C1_{A-B}$ at the liquid level 1. $h2_{A-B}$ is a liquid level difference calculated by using the capacity difference $C2_{A-B}$ at the liquid level 2.

The CPU 32 outputs a warning signal when the liquid level difference $h_{A-B}$ and the warning liquid level $H_{A-B}$ are compared and a mathematical formula (3) is satisfied.

$$H_{A-B} > h_{A-B} \quad (3)$$

Figure 4A:
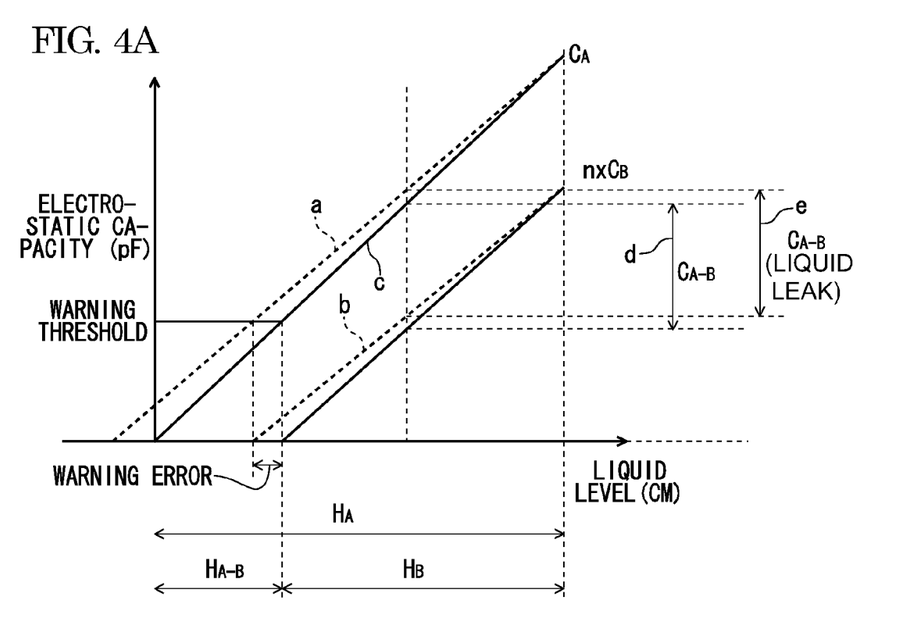
FIGS. 4A and 4B are graphs which show properties of the liquid level sensor 9 and the warning sensor 15 when there is a liquid leak to sensor electrodes (a tine electrode 9a and a detective electrode 15a).
Figure 4B:
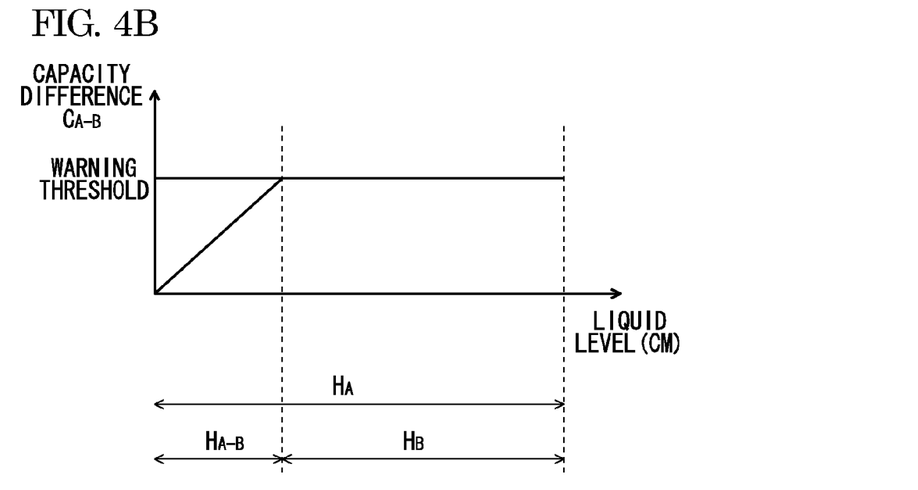

FIGS. 4A and 4B are graphs which show properties of the liquid level sensor 9 and the warning sensor 15 when there is a liquid leak to the sensor electrodes (the tine electrode 9a and the detective electrode 15a). Although it is assumed herein that there is a liquid leak between the tine electrode 9a and the tine electrode 12a located in the vapour phase part (refer to FIG. 6), the graphs are similar when dew is produced in the vapour phase part, or when liquids of different dielectric constants are separated in the liquid.

As shown in FIG. 4A, when there is a liquid leak at the tine electrode 9a, for the electrostatic capacity $C_A$ of the liquid level sensor 9, the electrostatic capacity increases as shown with the broken line a, and the influence is great when the liquid level is low, and the influence becomes small when the liquid level is high. Likewise, for the n times electrostatic capacity $n \cdot C_B$ of the liquid level sensor 15, the electrostatic capacity also increases as shown with the broken line b, and the influence is great when the liquid level is low, and the influence becomes small when the liquid level is high.

Therefore, when a warning threshold corresponding to the warning liquid level $H_{A-B}$ is determined merely by a signal of the electrostatic capacity $C_A$ of the liquid level sensor 9, an error (warning error) in the liquid level is produced between the case there is a liquid leak (the broken line a) and the case there is not a liquid leak (the solid line c).

In contrast, when the capacity difference $C_{A-B}$ between the electrostatic capacity $C_A$ of the liquid level sensor 9 and the n times electrostatic capacity $n \cdot C_B$ of the warning sensor 15 is obtained, the capacity difference $C_{A-B}$ is approximately equalized for the case there is a liquid leak (refer to the symbol e) and the case there is not a liquid leak (refer to the symbol d), and the influence of the liquid leak can be eliminated.

Therefore, as shown in FIG. 4B, by setting the warning threshold with the capacity difference $C_{A-B}$, the influence of the liquid leak is prevented, and the warning error can be nearly removed.

Figure 5:
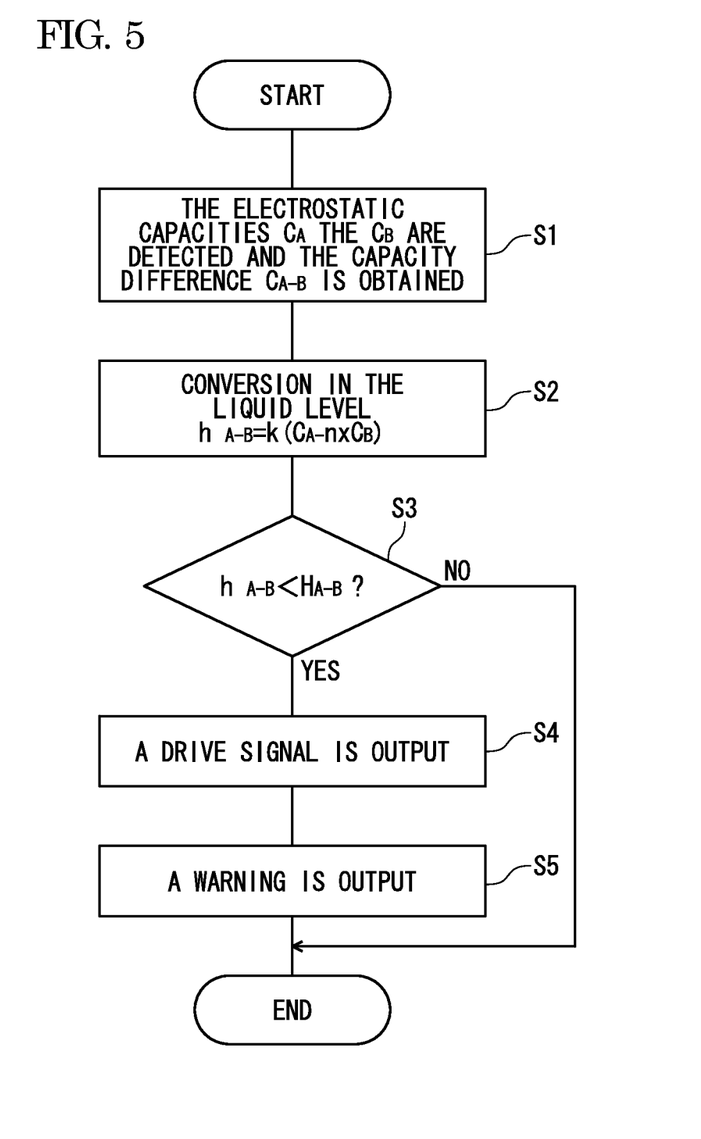
FIG. 5 is a flowchart which shows steps of a liquid level detecting operation.

FIG. 5 is a flowchart which shows steps of a liquid level detecting operation. The program of this operation is stored in the ROM 33 in the CPU 32, and is performed by the CPU 32. The CPU 32 detects the electrostatic capacity $C_A$ detected by the liquid level sensor 9 and the electrostatic capacity $C_B$ detected by the warning sensor 15 and obtains the capacity difference $C_{A-B}$ (step S1). The process of the step S1 is equivalent to a difference calculating part.

The CPU 32 multiplies the capacity difference $C_{A-B}$ by the liquid level correction coefficient k obtained from the dielectric constant of the liquid detected by the dielectric constant sensor 18 according to the previously described mathematical formula (2) to calculate the liquid level difference $h_{A-B}$ (step S2). The dielectric constant used at this time may be measured beforehand and stored in the RAM 34, or may be measured at the same time in the step S1.

The CPU 32 determines whether the liquid level difference $h_{A-B}$ is smaller than the warning liquid level $H_{A-B}$ so that the mathematical formula (3) is satisfied (step S3). When the liquid level difference $h_{A-B}$ is above the warning liquid level $H_{A-B}$, the CPU 32 just finishes this operation.

On the other hand, when the liquid level difference $h_{A-B}$ is smaller than the warning liquid level $H_{A-B}$, the CPU 32 changes from a signal of the calculated liquid level $h_A$ to a drive signal corresponding to the liquid level difference $h_{A-B}$ calculated in the step S2, outputs the drive signal to the motor 45 in the meter 40, and makes the indicator 41 indicate the liquid level (step S4).

Then, the CPU 32 outputs a warning signal and turns on the warning lamp 42 (step S5, refer to FIG. 1B). After this, the CPU 32 finishes this operation.

Thus, according to the liquid level detecting device of the embodiment, because the warning threshold is set with the capacity difference $C_{A-B}$, the liquid level can be detected precisely even when there is a liquid leak, when there is a drop of dew in the vapour phase part, or when liquids of different dielectric constants are separated.

Because the liquid level sensor has the tine electrode whose distance from the ground electrode is uniform, the value of the electrostatic capacity can be increased. Therefore, detection accuracy is improved, and the design is easy.

The present invention is not limited to the compositions of the above embodiment, and any kind of compositions are applicable as long as the functions that the compositions of the embodiment have can be achieved.

For example, although the detective electrode of the warning sensor is formed into a linear shape, the detective electrode may have the same shape as the tine electrode of the liquid level sensor, but have a different length. Thereby, the capacity ratio correction coefficient n may become a value of 1, and the design becomes easy.

In the embodiment, since the warning sensor which warns of a drop of the liquid level also serves as the second detecting part, the increase of components can be prevented, but the second detecting part may exist independently without necessarily being the warning sensor.

The present invention is useful in that when the liquid level of liquid in a tank is to be detected, the liquid level can be detected precisely even when there is a liquid leak, when there is a drop of dew in the vapour phase part, or when liquids of different dielectric constants are separated.

What is claimed is:

1. A liquid level detecting device for detecting a liquid level of liquid in a tank comprising
   a first detecting part that has a first electrode extending in a vertical direction in the tank and opposing to a ground electrode and configured to detect a first capacitance between the first electrode and the ground electrode;
   a second detecting part that has a second electrode extending in the vertical direction in the tank and opposing to the ground electrode and configured to detect a second capacitance between the second electrode and the ground electrode, a length of the second electrode being shorter than a length of the first electrode in the vertical direction at a bottom side; and
   a difference calculating part configured to calculate a difference between the first capacitance detected by the first detecting part and the second capacitance, detected by the second detecting part and scaled by a correction coefficient based on a dielectric constant of the liquid, as a capacity difference and to determine whether the liquid level in the tank is above a warning threshold based on the capacity difference.

2. The liquid level detecting device according to claim 1 further comprising a dielectric constant detecting part that is arranged at the bottom of the tank and configured to detect a dielectric constant of the liquid, wherein the difference calculating part is further configured to calculate the liquid level in the tank by using the dielectric constant detected by the dielectric constant detecting part as the correction coefficient.

3. The liquid level detecting device according to claim 1, wherein the tip of the second electrode at the bottom side is arranged at a position corresponding to the warning threshold, and an alarming signal is output when the capacity difference becomes smaller than the warning threshold.

4. The liquid level detecting device according to claim 1, wherein the first electrode and the ground electrode are formed into a tine shape, respectively, and the distance between the first electrode and the ground electrode is uniform.

5. The liquid level detecting device according to claim 1, wherein the first electrode and the ground electrode each include tined branches extending perpendicular to the vertical direction such that the tined branches of the first electrode are interdigitated with the tined branches of the ground electrode.

6. The liquid level detective device according to claim 1, wherein the capacity difference is equal in both a case where there is a liquid leak from the tank and a case where these is not a liquid leak from the tank.

7. The liquid level detective device according to claim 1, wherein the ground electrode is between the first electrode and the second electrode.

8. The liquid level detective device according to claim 1, wherein the first electrode and the ground electrode have a same length in the vertical direction.

9. The liquid level detective device according to claim 1, wherein the correction coefficient, when scaled with the second capacitance, equalizes a slope of the second capacitance with a slope of the first capacitance along a graph of capacitance, on one axis, and liquid level, on another axis.

* * * * *